United States Patent
Löffler (12)

(10) Patent No.: US 6,332,378 B1
(45) Date of Patent: Dec. 25, 2001

(54) METHOD AND DEVICE FOR PRODUCING SCREW ASSEMBLIES

(76) Inventor: Thomas Löffler, Rosenheimer Str. 23, D-83714 Miesbach (DE)

( * ) Notice: Subject to any disclaimer, the term of this patent is extended or adjusted under 35 U.S.C. 154(b) by 0 days.

(21) Appl. No.: 09/355,915

(22) PCT Filed: Feb. 12, 1998

(86) PCT No.: PCT/DE98/00398

§ 371 Date: Dec. 9, 1999

§ 102(e) Date: Dec. 9, 1999

(87) PCT Pub. No.: WO98/35791

PCT Pub. Date: Aug. 20, 1998

(30) Foreign Application Priority Data

Feb. 12, 1997 (DE) .............................. 197 05 346
Jun. 8, 1997 (DE) .............................. 197 23 899

(51) Int. Cl.[7] ................................. B25B 29/02
(52) U.S. Cl. ........................... 81/57.38; 81/429
(58) Field of Search .................... 81/57.38, 429; 73/761, 597, 862, 381; 254/29 A

(56) References Cited

U.S. PATENT DOCUMENTS

| | | |
|---|---|---|
| 2,562,831 | 7/1951 | Stone . |
| 3,943,819 | 3/1976 | Charron . |
| 3,954,004 | 5/1976 | Orner . |
| 4,569,229 | 2/1986 | de Halleux . |
| 4,636,120 | 1/1987 | Brandsberg et al. . |
| 4,676,109 | 6/1987 | Wallace . |
| 4,846,001 | 7/1989 | Kibblewhite . |
| 5,226,765 | 7/1993 | Walton . |
| 5,699,703 | * 12/1997 | Habele ................... 81/57.38 |
| 5,974,919 | 11/1999 | Habele . |
| 6,105,471 | * 8/2000 | Takayuki et al. ......... 81/57.38 |

FOREIGN PATENT DOCUMENTS

| | | |
|---|---|---|
| 2022079 | 12/1970 | (DE) . |
| 4311956 | 10/1974 | (DE) . |
| 2604510 | 8/1977 | (DE) . |
| 2714377 | 10/1978 | (DE) . |
| 0182185 | 5/1986 | (EP) . |
| 1512090 | 2/1968 | (FR) . |
| 2538470 | 6/1984 | (FR) . |
| 961621 | 6/1964 | (GB) . |

OTHER PUBLICATIONS

Soviet Patent Abstracts, Sec. PO, Wk. 9237, Oct. 28, 1992, and SU1687423A (Lengd Metal Wks.), Oct. 30, 1991.

* cited by examiner

Primary Examiner—James G. Smith
(74) Attorney, Agent, or Firm—Jacobson Holman, PLLC

(57) ABSTRACT

The invention relates to a method and a device for producing screw assemblies, which can be preferably used in industrial production assembly processes, in workshops and in installation technology supervision involving high safety standards. The invention also relates to special screws to carry out said method. The invention is characterized in that the actual elongation of the screw is measured during screwing.

11 Claims, 3 Drawing Sheets

METHOD AND DEVICE FOR PRODUCING SCREW ASSEMBLIES

BACKGROUND OF THE INVENTION

1. Field of the Invention

The present invention relates to a process and device for producing screw connections and can be used preferably in assembly processes in industrial production, workplace operation and in monitoring in plant engineering where there are high safety requirements.

2. The Prior Art

It is known from the prior art that in industrial manufacturing electronically controlled screw systems are being used more and more frequently. These comprise a drive unit and a tool spindle with a screw tool which screws in a screw with a predetermined screwing torque in order to press together the components to be joined together with a preset force. This force is designated as prestress force and originates from the change in length of the screw shank, designated hereinafter as elongation. In many applications it is necessary to adjust the prestress force to a predetermined value as precisely as possible. For this, it is required to determine the prestress force. It is known from the prior art to determine the prestress force indirectly by means of measuring the screwing torque during screwing. It is mainly torque or angle of rotation measuring systems integrated into the screw system which are utilised for making a screw connection. When a pre-adjusted torque is attained in screwing in the screw, a signal emitted by the torque measuring system is used for switching off the drive unit, or the screw is turned further about a preset angle of rotation, determined by the angle of rotation measuring system.

The following problems arise with indirect determination of the prestress force by torque measurement: as a screw is being tightened, a small portion only of the applied torque for the elongation of the screw, that is, for the production of prestress force, has an effect. The majority of the torque is absorbed by the friction on the screw thread and on the screw head. If the friction conditions are changed, these changes have a strong effect on the prestress force. Therefore, the abovedescribed devices cannot guarantee that narrow tolerances of prestress force are adhered to.

In order to overcome these difficulties, the prestress force has to be measured directly. Different processes and devices have been put forward for this purpose. A measuring ring in the form of a plain washer is known to be arranged underneath the screw head. This measuring ring is a sensor which gives off an electrical signal with the action of force. If the screw is tightened, the screw head presses on the measuring ring, and the prestress force can be measured directly. This process is very cost-intensive, since the measuring ring remains under the screw head following tightening of the screw connection. This process is accordingly restricted to special applications such as, for example, aeronautics or nuclear energy technology. Ongoing long-term monitoring of the contact force with measuring rings is only partially possible, as the latter comprise an uncontrollable null drift.

DE 4017726 describes a fastening screw having a shank provided at least partially with a thread and an actuating end on which a head, a bolt stop or the like, whereby a first end surface is formed on the actuating end of the fastening screw and a second end surface is formed on the free end, and measuring surfaces for ultrasound measuring are provided on both end surfaces, which extend over only a portion of the end surfaces and are arranged offset axially to the end surfaces in terms of an elevation and/or a depression. In this device the change in length of the screw is measured by ultrasound. By means of methods known to the specialist the prestress force is determined from the characteristic values of the materials and the geometric dimensions of the screw.

DE 19507391 concerns a screwing device for ultrasound-controlled tightening of screw connections.

Still another realization of ultrasonic measurement is shown in DE 4025430 concerning a torque controlled screwing head having an electroacoustic sensor to measure distortion.

Determining the change in length of the screw by using ultrasound does, however, have drawbacks. To detect the change in length with precision, the ultrasound has to be introduced into the bolt or screw in a defined manner. The technical problems to be solved in this process are considerable.

In particular, the bolt or screw to be used has to be provided with a special design of a ultrasound-initialising surface and a reflection surface. These surfaces need to be manufactured with high precision within close tolerances. Such requirements cannot be met by mass-production like that of standard screws. Thus, manufacturing costs for special screws to be used in processes comprising the measurement of prestress forces by ultrasound are considerable.

The use of laser beams for monitoring forces effective in specially designed bolts is disclosed in SU 1687423. This known monitoring does not fit to the production of screw connections under control of prestress forces.

DE 26045510 describes a process for determining the binding power by means of a bore reaching from the screw head axially into the screw shank and by means of a metering gauge inserted into the bore measuring the expansion of the screw shank. The drawback to this process is that contacting mechanical measuring for serial application is error-prone and inaccurate.

A similar process to this is described in EP 0182185, comprising a lock screw with a pressed-in pin which moves as the screw is being tightened and whose movement is measured mechanically.

SUMMARY OF THE INVENTION

It is an object of the present invention to overcome the prevailing problems of the prior art of producing screw connections by means of screws or bolts under the effect of predetermined initial tension forces, in particular to improve the quality of such screw connections in relation to technological and economical expenditures therefore.

In order to achieve this object, according to the present invention, a new process and a new device for producing a screw connection are provided.

The present invention thus consists in a process for producing a screw connection comprising two parts for instance in form of sheets, pressed together by means a screw having a screw head and a screw shaft or shank which is at least partially threaded, and a longitudinal hole preferably in form of a pocket bore extending from an open end on an outer surface of said screw head to a closed end within the screw shaft, the screw being screwed and further tightened by means of a screw driver producing a rotational movement so far that a predetermined prestress force is effected within the screw shaft which is lengthened under the tension of said prestress force, the process comprising the following process steps:

The screw is set to the parts to be connected by means of the screw driver, and it is positioned by an optical distance measuring device at the open end of said longitudinal hole on the outer surface of the screw head so that the optical distance measuring device can emit a measuring light beam through the longitudinal hole to its closed end. The optical distance measuring device can capture the light beam when reflected on a reflecting surface provided on the closed end, and can process interference of emitted and captured light for producing data of the distance between the optical distance measurement device and said reflecting surface.

The length of said longitudinal hole is measured by measuring the distance between the optical distance measuring device and the closed end of said hole.

The data of the length of the longitudinal hole is recorded first when screwing of the screw by means of the screw driver is started but not yet advanced to a tightening of the screw so far as to produce a significant tension force within the screw shaft.

The process continues to screw in and further tightening of the screw, and to measure the length of said longitudinal hole, and to record data received by continued measurement of the length of the longitudinal hole.

The recorded data is processed to produce data of a change of the length of the longitudinal hole under the effect of a tension force produced by progressive tightening.

The data is compared when raised by recording and processing during the current screwing and tightening process with predetermined stored data of a regular screwing and tightening process.

The screw driver is controlled so that the data raised during the current screwing and tightening process are adapted to the predetermined stored data of a regular screwing and tightening process.

The advantage of the inventive process consists in that optical measuring processes operate in a contact-free and inertia-free manner. This process can be applied, for example, whenever strong mechanical vibrations on the screw connection do not permit the use of measuring process making contact.

The inventive process may be carried out by a series of discrete similar process steps or by continuous procedures. Especially when continuous or quasi-continuous procedures are used in plants for high performance, it is advantageous to start with high speed and slow the rotational speed of the screw driver down with progressing length of said longitudinal hole under the effect of progressing tension force within the screw shaft.

A particular embodiment of this process consists in that a screw is used having a longitudinal hole in form of a pocket bore with a closed end which forms a light reflecting base surface, or in form of a core bore including a longitudinal core fixed at a closed end of the bore to the screw shaft and having a free end with a light reflecting front surface, the light beam emitted and again captured by the optical length measuring device being reflected by either the reflecting base surface or the reflecting front surface.

In another advantageous embodiment of the inventive process, an additional other distance measurement is carried out for raising data of a distance between said optical distance measuring device and the open end of said longitudinal hole on the outer surface of the screw head, and the data so raised from the second distance measuring device are processed together with data raised from said optical distance measuring device for producing corrected data of the length of said longitudinal hole.

In still another advantageous embodiment of the inventive process, the rotational speed of the screw driver is controlled slowing it down with progressing length of said longitudinal hole under the effect of progressing tension force within the screw shaft.

Another embodiment of the inventive process may be characterized in that production of the screw connection is monitored in addition by measuring of the angle of rotation and/or the torque. The advantage of this process is that the plausibility of the bore measuring can be tested by recording of the additional measuring variables, by means of which the reliability of the process is substantially increased.

In the inventive process, the screw temperature can be measured to compensate temperature disturbance variables. The advantage so achieved is that temperature disturbance variables, which could lead to expansion of materials and thus to measuring errors in measuring of the bore, are compensated. In addition, characteristic measuring errors attributable to changes in temperature are recorded in the form of series of measurements and are stored as a value table, for example. For correcting a length measurement the current, length measurement value is related to the current temperature value and is corrected by means of conventional correction algorithms of the temperature error. This effectively improves the quality of the screw connection.

The present invention consists also in a device for producing a screw connection comprising two parts for instance in form of sheets. The sheets are pressed together by means of a screw having a screw head and a screw shaft or shank which is at least partially threaded. A longitudinal hole preferably in form of a pocket bore extends from an open end on an outer surface of the screw head to a closed end within the screw shaft. The screw being screwed and further tightened by means of a screw driver producing a rotational movement so far that a predetermined prestress force is effected within the screw shaft which is lengthened under the tension of said prestress force.

A screw driver producing a rotational screwing movement, preferably in form of a screw driving tool driven by a motor which can be automatically controlled, or in form of a manually operated screw driving tool is provided.

An optical distance measuring device producing data of a distance to a light reflecting surface by processing of an interference between an emitted light beam and a captured light beam consisting in light of the emitted light beam when reflected on the light reflecting surface is provided.

The optical distance measuring device is adapted to be brought into a position at the open end of the longitudinal hole and emits a light beam through the longitudinal hole in the direction to its closed end. It captures the light beam when reflected on a reflecting surface provided on the closed end.

An electronic data conversion and processing unit converts and processes data produced by the optical distance measuring device into data indicating the state and progress of a tension force effected in a screw by screwing and tightening the screw.

A controlling unit for comparing the data produced in the electronic conversion and processing unit with predetermined stored data of regular screwing and tightening processes is provided. It is for producing controlling signals to be sent to the screw driver for automatically controlling a screw driving motor of the screw driver, or to be displayed to an operator of a manually operated screw driving tool.

In a particular advantageous embodiment of the inventive device, a second distance measuring device for raising data of a distance between the optical distance measuring device and the open end of the longitudinal hole is provided. The data raised by the second distance measuring device are sent to the conversion and processing unit for producing corrected data of the length of said longitudinal hole. The second measuring device is in a fixed position in connection with the optical distance measuring device.

A preferred embodiment of the inventive device is characterized in that the optical distance measuring device is integrated in a rod having a light sensor on a front end to be brought from an idle position into an operating position near the open end of the longitudinal hole to keep the sensor in a predetermined distance from a light beam reflecting surface in the longitudinal hole. The predetermined distance corresponds to a predetermined measuring range of the optical measuring device. The optical distance measuring device may be combined with, or integrated in the screw driver, and is preferably a miniature interferometer.

The chief advantage of the inventive device is the fact that a measuring signal is obtained correlating closely to the prestress force, which is almost completely devoid of measuring errors arising from the influence of friction in the thread or on the screw head. The device can be used alternatively for controlling or regulating the screwing-in process. It is possible to combine this signal with the measuring signals, previously known from the prior art, of the measured variables of torque, angle of rotation and/or screw-in depth. It is also possible, if required, to combine more than two measuring signals.

In the particular embodiment of the inventive device having the optical distance measuring device integrated in a rod. The rod is brought out of its rest position by a preset path in the direction of the measuring surface, for example, up to 1 mm in front of the base surface of the pocket bore. The sensor measures the section between the measuring surface of the sensor and the base surface of the pocket bore. The overall length to be measured results from the length of the preset path and the measured distance between the measuring surface of the sensor and the base surface of the pocket bore. The advantage is that a measuring process or a measuring device suited to very small distances only can be used. These measuring devices are particularly accurate and cost-effective as well.

In the particular embodiment, the inventive device has a second distance measuring device in addition to the optical distance measuring device. It is possible to detect irregularities of the position of the optical distance measuring device relative to the open end of the longitudinal hole within the screw of the connection to be produced and to correct measurements of the optical distance measuring device as to the length of the longitudinal hole. When the screwdriver is released from the screw head by mechanical deficiencies, this change in position is detected by the second distance measuring device. A measuring signal is generated which is used for correcting the measuring signal of the first measuring system. Thus, measuring errors arising from changes in position of the optical distance measuring device relative to a screw head are eliminated.

Inventive manual screwdrivers having an optical distance measuring device integrated are preferably used in in small workplaces for producing precision screw connections.

Further features and advantages of the invention will be understood taking in consideration the following description of particular embodiments of the invention when read in connection with the accompanying drawings.

DESCRIPTION OF THE INVENTION

Figure 1:
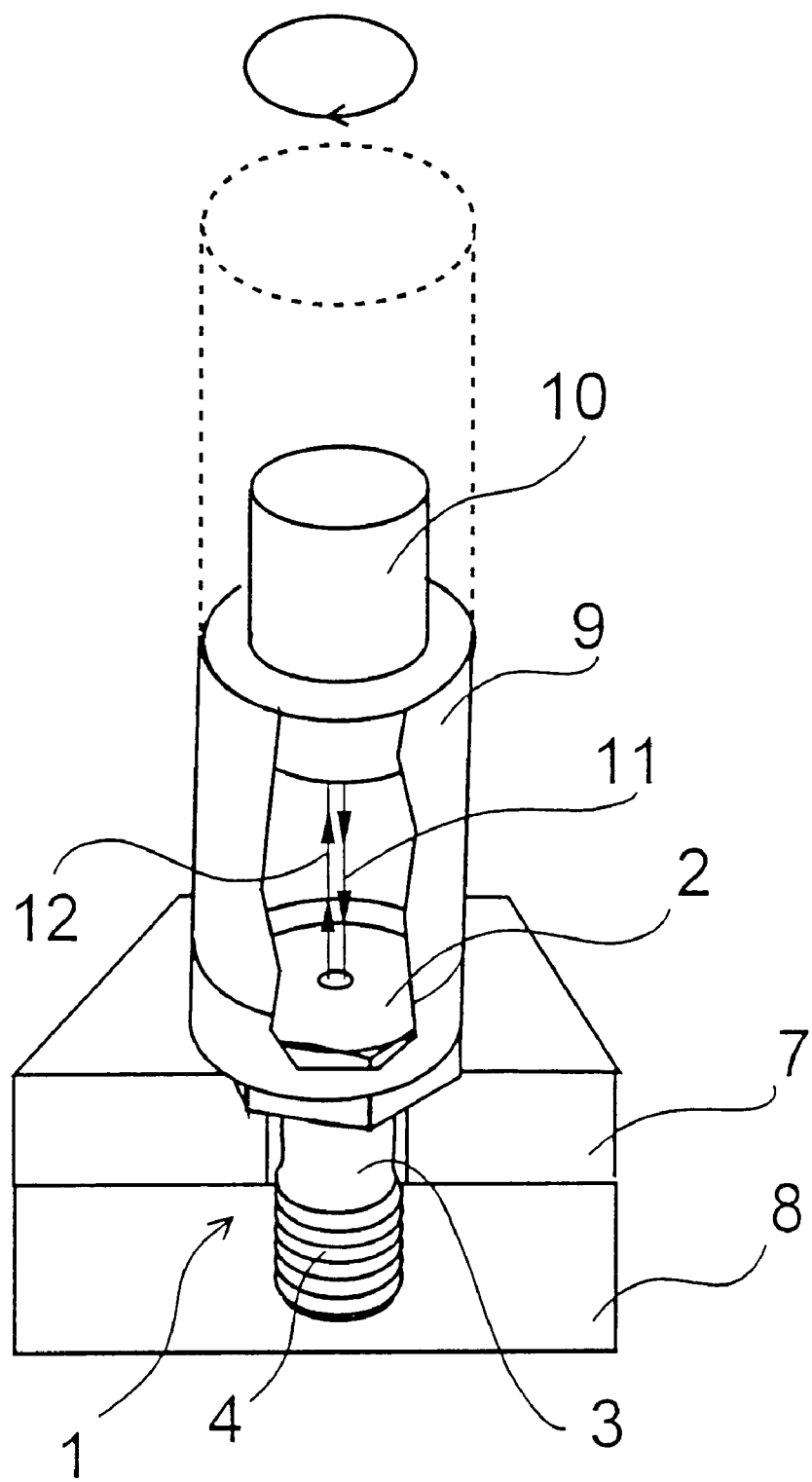
FIG. 1 shows a first embodiment of the device according to the present invention for producing a screw connection.

FIG. 1 illustrates a first embodiment of the device according to the present invention for producing a screw connection. Two parts in form of sheets 7 and 8 to be connected are held together by means of screw 1. Screw head 2 is rotated in the arrow direction by means of a screw tool 9 to press sheets 7 and 8 together with a predetermined prestress force. Screw driver tool 9 is rotated either automatically or manually. A self-rotating miniature interferometer 10 is arranged in precise position in screw driver tool 9. Miniature interferometer 10 emits a light-measuring beam 11 which is reflected on reflecting base surface 6 of pocket bore 5. Reflected light beam 12 is captured by miniature interferometer 10 and processed to produce distance data which are sent to an evaluation unit, not illustrated here. The specialist knows that the distance between miniature interferometer 10 and the outer surface of the screw head must be known. Experience shows that it is suitable to adjust this distance by calibration at zero. Next, the length of measuring bore 5 is determined in the unloaded state. As the screw is tightened, measuring bore 5 elongates, whereby the changes in length are recorded online and converted by a control electronics into control signals for controlling the drive of the screw driver mechanism.

The screwing-in process is controlled with automatic screwing of the screw. In addition to this, data are filed in a control and storage unit which ensure an optimized screwing-in process. Thus the rotational speed is regulated such that it is higher at the commencement of the screwing-in process than at the end. This guarantees that the screwdriver is stopped at the right time when the predetermined prestress force effective in the screw is accurately attained. The data for the widest range of screw connections are stored in the control and storage unit.

If the screw is rotated manually then the prestress force can be indicated directly to the mechanical engineer by way of an optical analog display.

Miniature interferometers are preferably used as measuring devices for the bore. For example, 500 mm with a resolution of 10 nanometers can be measured with these instruments. There are miniature interferometers having sensor heads of the size of a pencil, which can accordingly be well integrated into a rotating spindle of an automatic screwdriver.

If a screw connection is to be monitored over a long period, the miniature interferometer can be connected to screw head 2 so as to produce a detachable, stable and precise structure. The specialist knows to select the type of structure which would be appropriate to meet the requirements of particular circumstances. Other optical measuring instruments with comparable measuring properties can also be used instead of a miniature interferometer.

Figure 2:
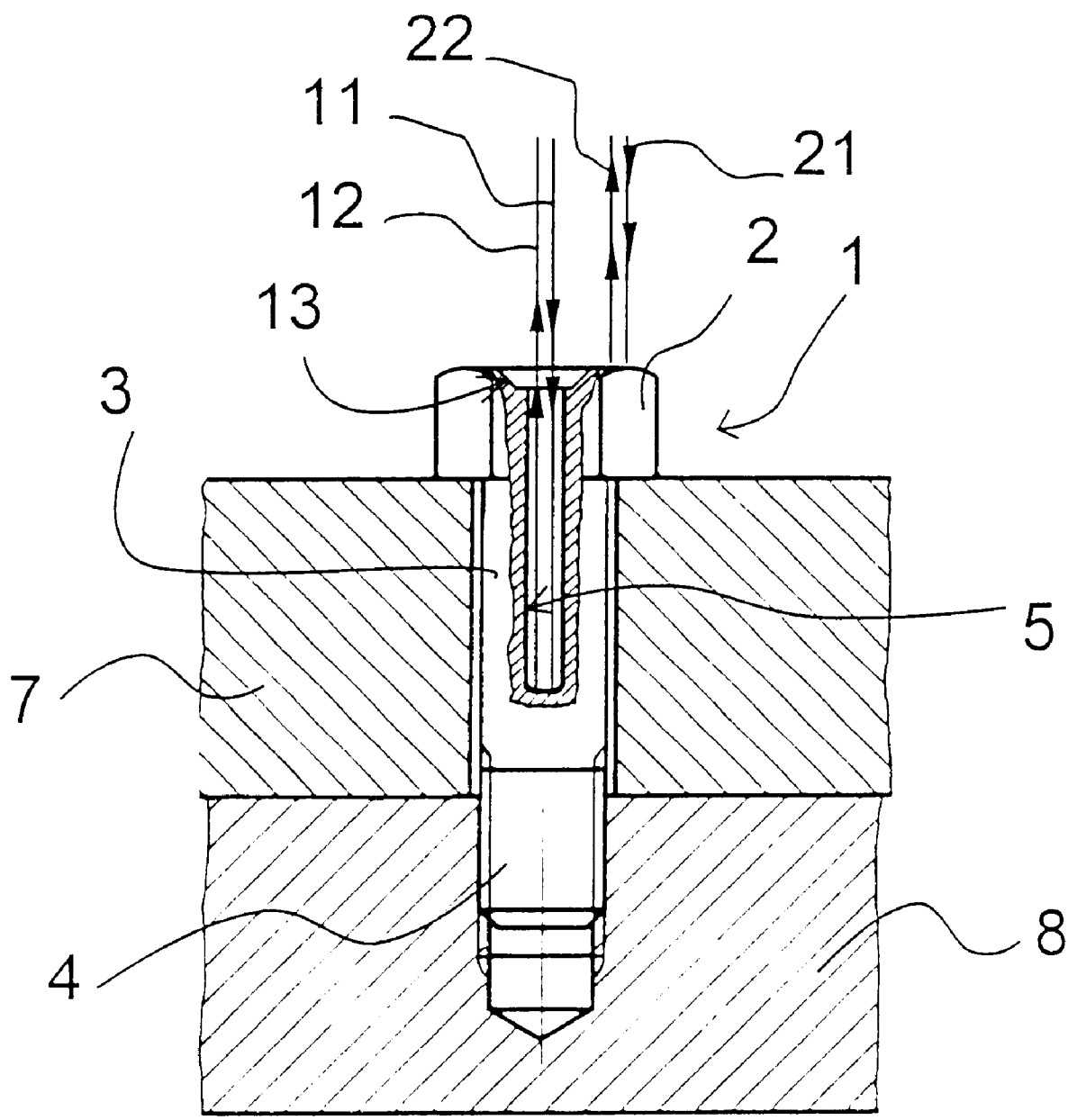
FIG. 2 shows a second embodiment of the device according to the present invention for producing a screw connection.

FIG. 2 diagrammatically illustrates a second embodiment of the device according to the present invention for producing a screw connection. A first optical distance measuring device is provided for measuring the length of a longitudinal hole 5 within screw 1 by emitting light beam 11 and capturing reflected light beam 12. A second distance measuring device(not illustrated) emits a reference measuring light beam 21 to an outer surface of screw head 2 which reflects it. A reflected light beam 22 is captured by the second distance measuring device and processed to produce data indicating the position, and any change of position, of the first optical distance measuring device in relation to the screw head 2.

In particular, the second distance measuring device detects irregularities of the position of the screw driver in connection with the first optical distance measuring device relative to the screw head 2. When screwdriver tool 9 is detached from screw head 2 because of mechanical deficiencies of the screw driver mechanism, the resulting change of position is detected by the second distance measuring device, and correcting data are generated and used for correcting the data raised from the first optical distance measuring device. Thus, measuring errors arising from changes in position of the first measuring system relative to screw head 2 are eliminated.

Figure 3:
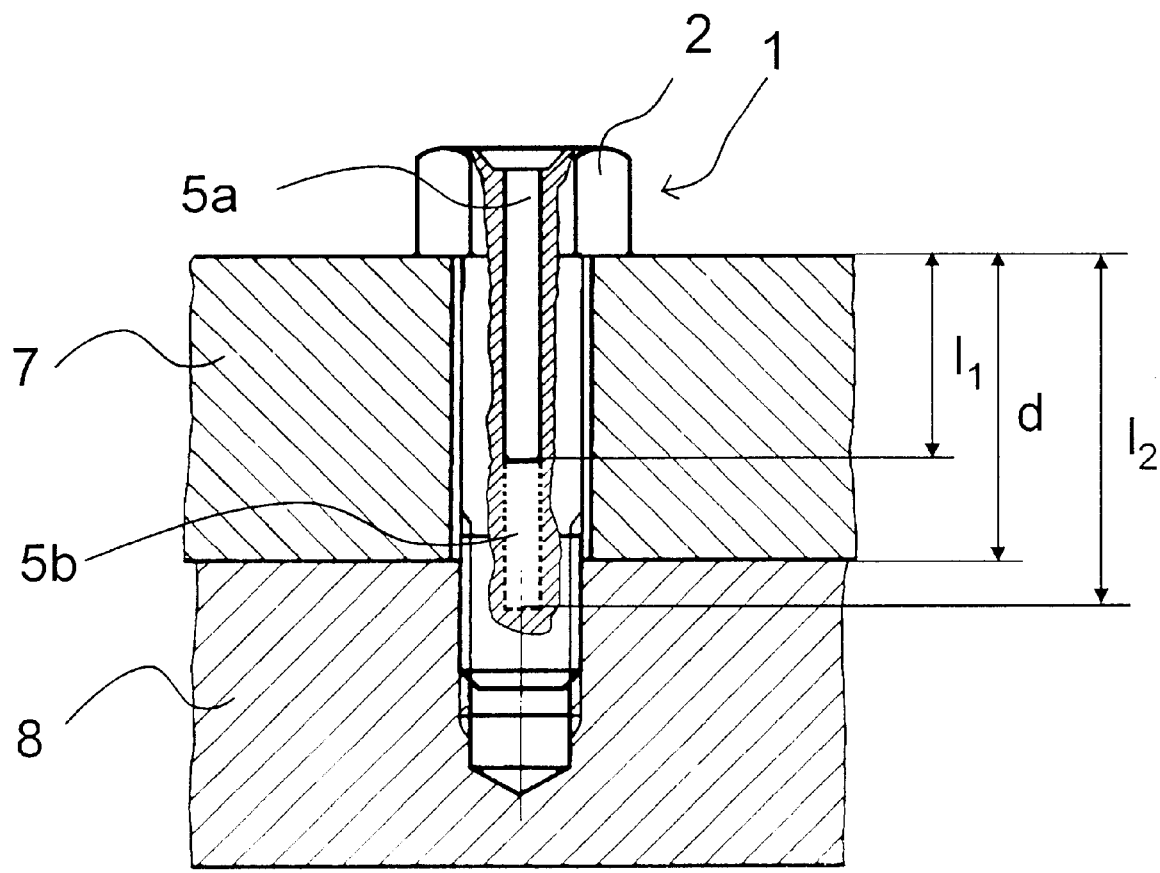
FIG. 3 shows a cross-section through a complete screw connection, and additional explanatory indications of the conditions existing during production of the screw connection.

FIG. 3 assists in explaining the conditions existing in producing the screw connection. Screw 1 with pocket bore 5 (5a, 5b) connects part 7 with part 8. These parts may be sheet metal. Part 7 has thickness d. The threaded section of the screw shaft is screwed into a threaded hole within part 8. When the screw is tightened, the screw shaft is elongated mainly in a section included in part 7 and having the thickness d. To optimize the accuracy of recording the real elongation of the screw shaft, the pocket bore 5 within the screw shaft should be as long as the actual area of elongation of the screw so that in the present case recording of elongation would suitably seize said section included in part 7 only having the thickness d.

The pocket bore 5 should not project into the threaded section of the screw shaft, since it would undesirably weaken the screw. It is possible to adjust characteristics of elongation along the screw shaft under a tension force by variation of the diameter of the pocket bore along the screw shaft, and of the remaining material of the screw shaft in cross-section. Where the diameter of the pocket bore is large, the remaining material of the screw shaft is weakened and more elongated under the stress of a tension force than in sections where the pocket bore has a small diameter.

What is claimed is:

1. A process for producing a screw connection comprising two parts in a form of sheets, said sheets being pressed together by a screw, said screw having a screw head and a screw shaft or shank which is at least partially threaded, and a longitudinal hole shaped as a pocket bore extending from an open end on an outer surface of said screw head to a closed end within the screw shaft, the screw being screwed and further tightened by a screw driver, said screw driver producing a rotational movement effecting a predetermined prestress force within the screw shaft which is lengthened under tension of said prestress force, the process comprising the following process steps:

setting the screw to the parts to be connected by the screw driver;

positioning an optical distance measuring device at the open end of said longitudinal hole on the outer surface of said screw head so that the optical distance measuring device can emit a measuring light beam through the longitudinal hole to its closed end;

capturing said light beam when reflected on a reflecting surface provided on said closed end;

processing interference of emitted and captured light for producing data corresponding to the distance between the optical distance measurement device and said reflecting surface;

measuring the length of said longitudinal hole by measuring the distance between the optical distance measuring device and the closed end of said hole;

recording data of the length of said longitudinal hole first when screwing of the screw by the screw driver is started but not yet advanced to tightening the screw so far as to produce a significant tension force within the screw shaft;

continuing to screw in and further tighten the screw;

measuring the length of said longitudinal hole;

recording data received by continued measurement of the length of said longitudinal hole;

processing the recorded data to produce a change of the length data of said longitudinal hole under the effect of a tension force produced by progressive tightening;

comparing the data raised by recording and processing during the screwing and tightening process with predetermined stored data of a predetermined screwing and tightening process; and controlling the screw driver so that the data raised during the current screwing and tightening process are adapted to said predetermined stored data of a predetermined screwing and tightening process.

2. The process as claimed in claim 1, wherein said screw has a longitudinal hole shaped as a pocket bore with a closed end which forms a light reflecting base surface, including a longitudinal core fixed at a closed end of the bore to the screw shaft and having a free end with a light reflecting front surface, the light beam emitted and again captured by the optical length measuring device being reflected by either the reflecting base surface or the reflecting front surface.

3. The process as claimed in claim 1, wherein another distance measurement is carried out for raising data of a distance between said optical distance measuring device and the open end of said longitudinal hole on the outer surface of the screw head, and the data raised from the second distance measuring device being processed together with data raised from said optical distance measuring device for producing corrected data of the length of said longitudinal hole.

4. The process as claimed in claim 1, wherein the rotational speed of the screw driver is controlled by slowing it down with progressing length of said longitudinal hole under the effect of progressing tension force within the screw shaft.

5. The process as claimed in claim 1, wherein production of the screw connection is monitored in addition by measuring the angle of rotation and/or the torque.

6. The process as claimed in claim 1, wherein the screw temperature is measured to compensate temperature disturbance variables.

7. The process as claimed in claim 1, wherein said screw has a longitudinal hole shaped as a core bore including a longitudinal core fixed at a closed end of the bore to the screw shaft and having a free end with a light reflecting front surface, the light beam emitted and again captured by the optical length measuring device being reflected by either the reflecting base surface or the reflecting front surface.

8. A device for producing a screw connection comprising two parts in a form of sheets, said sheets pressed together by a screw, said screw having a screw head and a screw shaft or shank which is at least partially threaded, and a longitudinal hole in a form of a pocket bore extending from an open end on an outer surface of said screw head to a closed end within the screw shaft, the screw being screwed and further tightened by a screw driver, said screw driver producing a rotational movement effecting a predetermined prestress force within the screw shaft which is lengthened under the tension of said prestress force, the device comprising:

- a screw driver for producing a rotational screwing movement, in a form of a screw driving tool driven by a motor which can be automatically controlled, or in a form of a manually operated screw driving tool;
- an optical distance measuring device producing data of a distance to a light reflecting surface by processing of an interference between an emitted light beam and a captured light beam consisting in light of the emitted light beam when reflected on said light reflecting surface;
- the optical distance measuring device being adapted to be brought into a position at the open end of said longitudinal hole and emitting a light beam through said longitudinal hole in the direction to its closed end and for capturing the light beam when reflected on a reflecting surface provided on said closed end;
- an electronic data conversion and processing unit for converting and processing data produced by the optical distance measuring device into data indicating the state and progress of a tension force effected in a screw by screwing and tightening the screw;
- a controlling unit for comparing the data produced in the electronic conversion and processing unit with predetermined stored data of regular screwing and tightening processes, and for producing controlling signals to be sent to the screw driver for automatically controlling a screw driving motor of the screw driver, or being displayed to an operator of a manually operated screw driving tool.

9. The device as claimed in claim 8, wherein a second distance measuring device for raising data of a distance between said optical distance measuring device and the open end of said longitudinal hole is provided and the data raised by said second distance measuring device being sent to the conversion and processing unit for producing corrected data of the length of said longitudinal hole, said second measuring device being in a fixed position in connection with said optical distance measuring device.

10. The device as claimed in claim 8, wherein the optical distance measuring device is integrated in a rod having a light sensor on a front end to be brought from an idle position into an operating position near the open end of said longitudinal hole so keeping the sensor in a predetermined distance from a light beam reflecting surface in said longitudinal hole, and said predetermined distance corresponding to a predetermined measuring range of the optical measuring device.

11. The device as claimed in claim 8, wherein the optical distance measuring device is combined with, or integrated in the screw driver, and is preferably a miniature interferometer.

* * * * *